(12) United States Patent
Ribaldone et al.

(10) Patent No.: US 10,173,736 B2
(45) Date of Patent: Jan. 8, 2019

(54) AERODYNAMIC DEVICE FOR MOTOR-VEHICLE

(71) Applicant: C.R.F. Societa Consortile per Azioni, Orbassano (Torino) (IT)

(72) Inventors: Enrico Modesto Ribaldone, Orbassano (IT); Luca Miretti, Orbassano (IT)

(73) Assignee: C.R.F. Societa Consortile per Azioni, Orbassano (Turin) (IT)

( * ) Notice: Subject to any disclaimer, the term of this patent is extended or adjusted under 35 U.S.C. 154(b) by 50 days.

(21) Appl. No.: 15/346,795

(22) Filed: Nov. 9, 2016

(65) Prior Publication Data
US 2017/0166267 A1    Jun. 15, 2017

(30) Foreign Application Priority Data
Dec. 9, 2015    (EP) .................................... 15198600

(51) Int. Cl.
*B62D 35/00* (2006.01)
*B62D 37/02* (2006.01)
*F15D 1/12* (2006.01)
*C02F 1/467* (2006.01)
(Continued)

(52) U.S. Cl.
CPC ........... *B62D 35/005* (2013.01); *B62D 37/02* (2013.01); *F15D 1/12* (2013.01); *C02F 1/4672* (2013.01); *C02F 1/78* (2013.01); *C02F 2001/46147* (2013.01); *C02F 2201/4613* (2013.01); *C02F 2201/4617* (2013.01); *C02F 2201/46115* (2013.01); *C02F 2209/20* (2013.01);
(Continued)

(58) Field of Classification Search
CPC .... B62D 35/004; B62D 35/005; B62D 35/02; B62D 37/02

USPC ............................................. 296/180.1, 180.5
See application file for complete search history.

(56) References Cited

U.S. PATENT DOCUMENTS

| 4,441,751 A | * | 4/1984 | Wesley | ................. B62D 35/00 105/1.1 |
| 4,659,130 A | * | 4/1987 | Dimora | ................ B62D 35/005 293/118 |

(Continued)

FOREIGN PATENT DOCUMENTS

| DE | 3630645 A1 | 3/1988 |
| DE | 102011111456 A1 | 2/2013 |
| DE | 102014104156 A1 | 10/2015 |

OTHER PUBLICATIONS

Computer generated translation of DE 3630645, printed Feb. 23, 2018.*

(Continued)

*Primary Examiner* — Gregory A Blankenship
(74) *Attorney, Agent, or Firm* — RMCK Law Group, PLC

(57) ABSTRACT

Aerodynamic device for a motor-vehicle including a panel structure located under the front part of the motor-vehicle and elastically biased towards a raised position and configured to be moved towards a lowered position due to an airflow which invests the motor-vehicle during travel. The aerodynamic device includes a bag structure provided inside of a cavity for receiving in its interior the airflow which invests the motor-vehicle during travel, in such a way that above a predetermined threshold value of the motor-vehicle speed, the bag structure is inflated and pushes the panel structure towards its lowered position.

10 Claims, 7 Drawing Sheets

(51) Int. Cl.
*C02F 1/78* (2006.01)
*C02F 1/461* (2006.01)

(52) U.S. Cl.
CPC ...... *C02F 2209/22* (2013.01); *C02F 2209/23* (2013.01); *C02F 2307/06* (2013.01)

(56) References Cited

U.S. PATENT DOCUMENTS

| | | | | |
|---|---|---|---|---|
| 2003/0116996 | A1* | 6/2003 | Soja | B62D 35/005 296/180.5 |
| 2004/0113457 | A1* | 6/2004 | JaCquemard | B62D 35/005 296/180.1 |
| 2005/0248184 | A1* | 11/2005 | Piffaretti | B60J 5/04 296/187.03 |
| 2008/0303309 | A1 | 12/2008 | Dayton | |
| 2010/0052362 | A1* | 3/2010 | Reuvekamp | B29C 65/02 296/180.1 |
| 2012/0074728 | A1* | 3/2012 | Senatro | B62D 35/001 296/180.4 |
| 2013/0049399 | A1 | 2/2013 | Hoelzel et al. | |
| 2013/0057022 | A1* | 3/2013 | Hoelzel | B62D 35/005 296/180.5 |
| 2014/0175831 | A1* | 6/2014 | Hoelzel | B62D 35/005 296/180.5 |
| 2015/0175222 | A1* | 6/2015 | Reuvekamp | B62D 35/005 296/180.1 |
| 2015/0239511 | A1* | 8/2015 | Reuvekamp | B62D 35/005 296/180.1 |
| 2015/0274221 | A1 | 10/2015 | Hoelzel et al. | |
| 2017/0166267 | A1* | 6/2017 | Ribaldone | B62D 35/005 |
| 2017/0355333 | A1* | 12/2017 | Kishima | B60R 19/48 |

OTHER PUBLICATIONS

European Search Report dated May 30, 2016 for European Patent Application No. 15198600.7, 4 pages.

\* cited by examiner

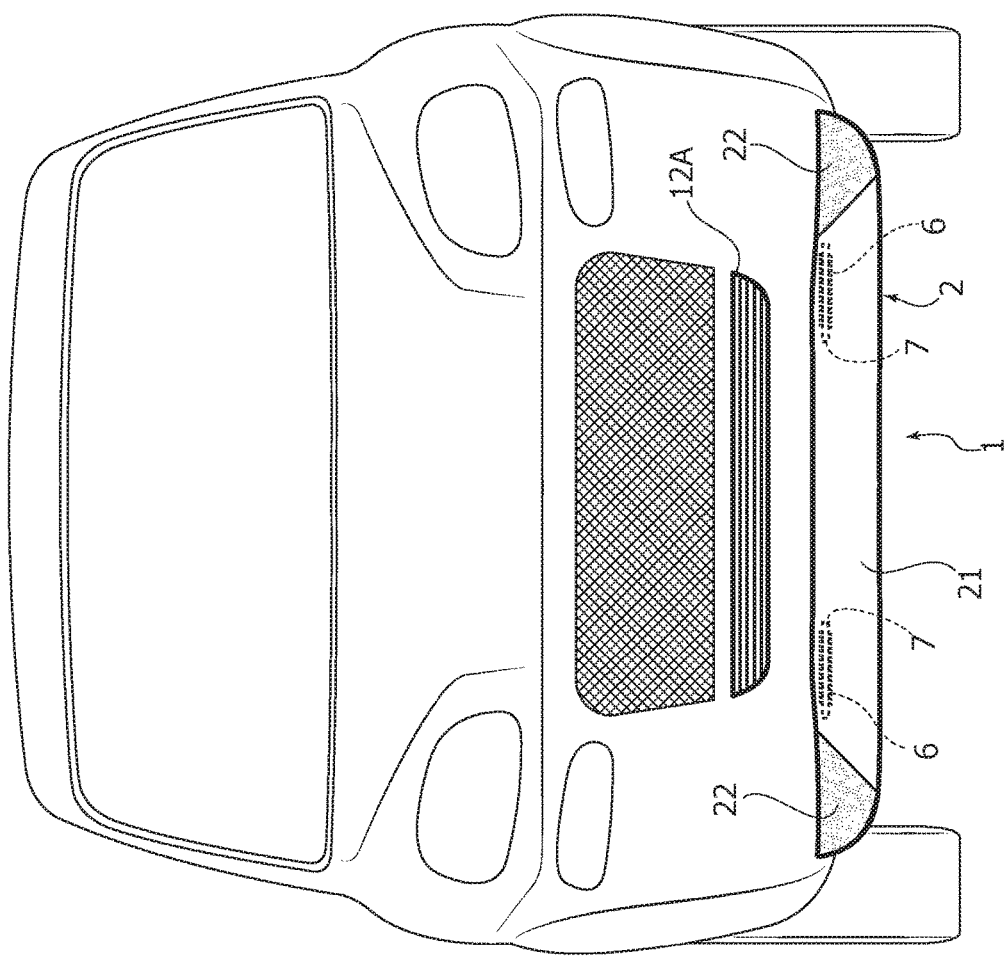

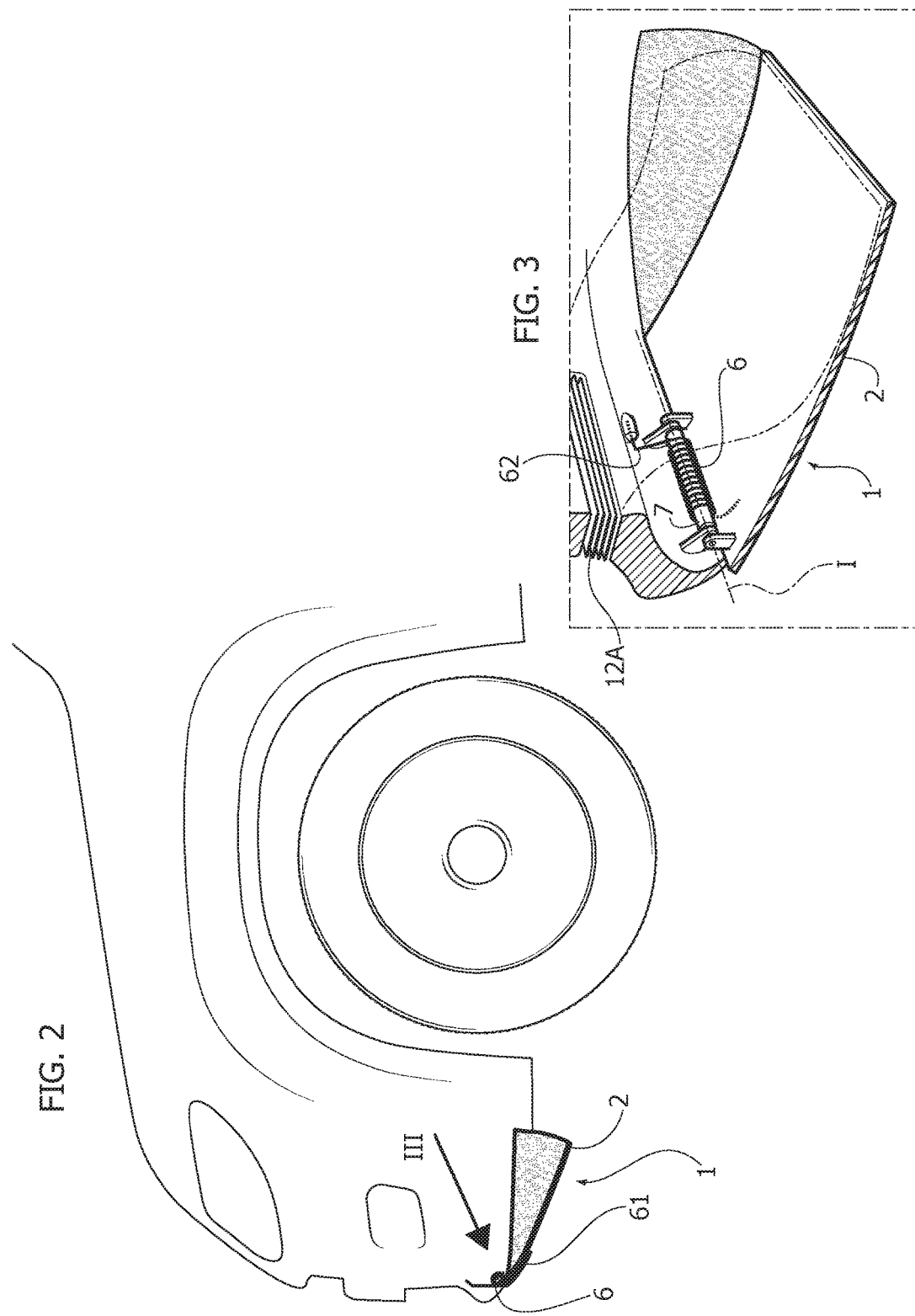

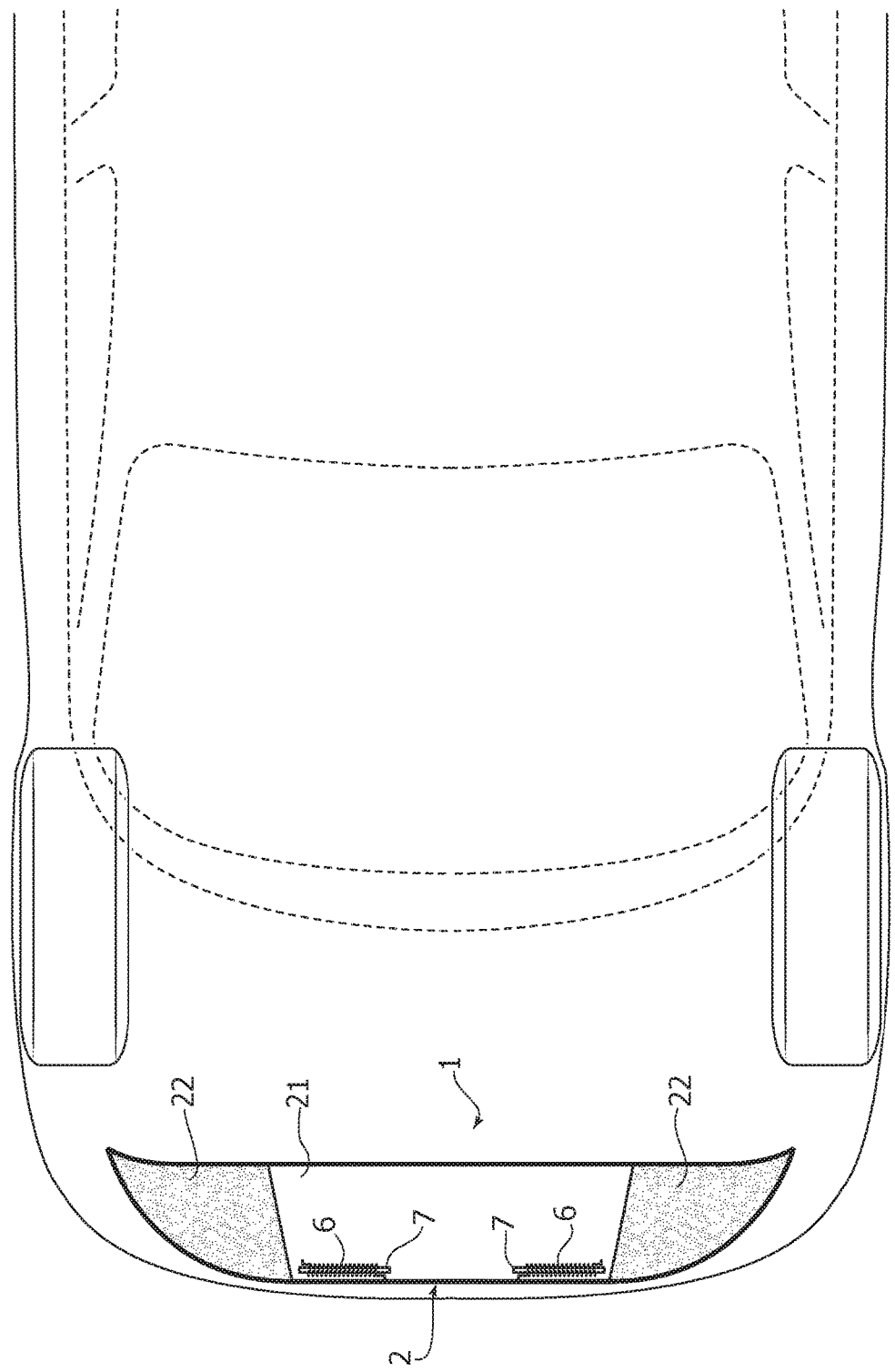

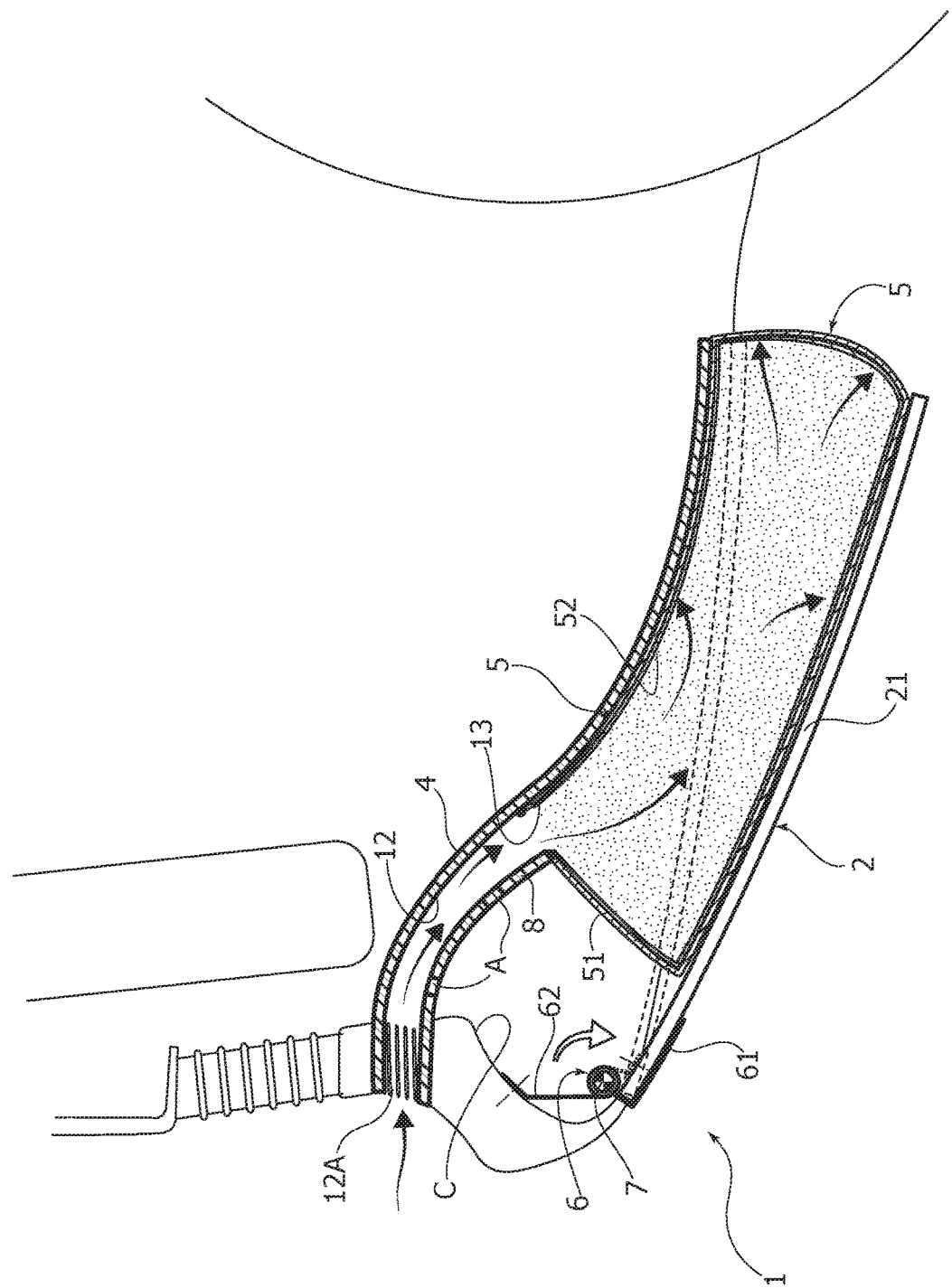

AERODYNAMIC DEVICE FOR MOTOR-VEHICLE

CROSS REFERENCE TO RELATED APPLICATIONS

This application claims priority to European Patent Application No. 15198600.7 filed on Dec. 9, 2015, the entire disclosure of which is incorporated herein by reference.

FIELD OF THE INVENTION

The present invention relates to an aerodynamic device for a motor-vehicle, of the type wherein a panel structure is provided under the front part of the motor-vehicle and the panel structure is movable between a raised position and a lowered position.

PRIOR ART

An aerodynamic device of this type is known for example from document US 2004/0113457 A1. The panel structure of the device, which is movable between a raised position and a lowered position, has the main function of reducing the space between the lower surface of the motor-vehicle and the road when the vehicle has a speed which is higher than a threshold value, in order to achieve a depression aerodynamic effect which presses the vehicle on the road. At the same time the panel structure can be maintained by spring means in a raised position when the motor-vehicle is moving instead at relatively low speed, in such a way as to enable the overcoming of obstacles present on the road. Another aerodynamic device having the features indicated above is known from document DE 363 064 5 A1.

OBJECT OF THE INVENTION

The object of the present invention is to provide an aerodynamic device of the type indicated above which presents a simple constructive solution, which is of low cost and at the same time results to be efficient and reliable during its operation.

SUMMARY OF THE INVENTION

The above mentioned objects are achieved by means of an aerodynamic device for a motor-vehicle of the type indicated in the preamble of claim 1, characterized in that said aerodynamic device further comprises a bag structure arranged inside said cavity between said panel structure and said upper wall for receiving in its interior a portion of said airflow, in such a way that above said predetermined threshold value of the motor-vehicle speed, said bag structure is inflated and pushes said panel structure towards its lowered position.

In a preferred embodiment the device according to the invention further comprises an intermediate wall placed between said upper wall and said panel structure, having its front edge rigidly fixed to the motor-vehicle bumper, in which said upper wall and said intermediate wall define a duct for directing said airflow inside said bag structure, extending starting from an inlet opening located on the front surface of the motor-vehicle.

Furthermore, again according to a preferred embodiment, the bag structure has a mouth connected to, and in communication with, a terminal end of said directing duct, in such a way that said duct conveys said airflow inside said bag structure.

According to a further characteristic, the bag structure comprises a first outer bag element having an upper portion connected to said upper wall of the device and having a lower portion connected to said panel structure and further comprises a second inner bag element, wherein said outer bag element and said inner bag element together define said mouth connected to, and in communication with, a terminal end of said directing duct, in such a way that said duct conveys said airflow inside said bag structure.

Thanks to the above mentioned characteristics, the aerodynamic device according to the present invention results simple, of low cost, efficient and reliable in its operation. The aerodynamic device according to the invention also enables the obtaining of the desired aerodynamic effect ensuring at the same time the device integrity in any travel condition.

DETAILED DESCRIPTION OF SOME EMBODIMENTS

Further features and advantages of the invention will become apparent from the following description with reference to the annexed figures, given purely by way of non limiting example, in which:

FIG. 1 is a front view of a motor-vehicle having the aerodynamic device according to the present invention;

FIG. 2 is a side-view of the motor-vehicle and of the device illustrated in FIG. 1;

FIG. 3 is a partial perspective view of the device illustrated in FIGS. 1 and 2;

FIG. 4 is a bottom view of the motor-vehicle and of the device illustrated in FIGS. 1 and 2;

Figure 5:
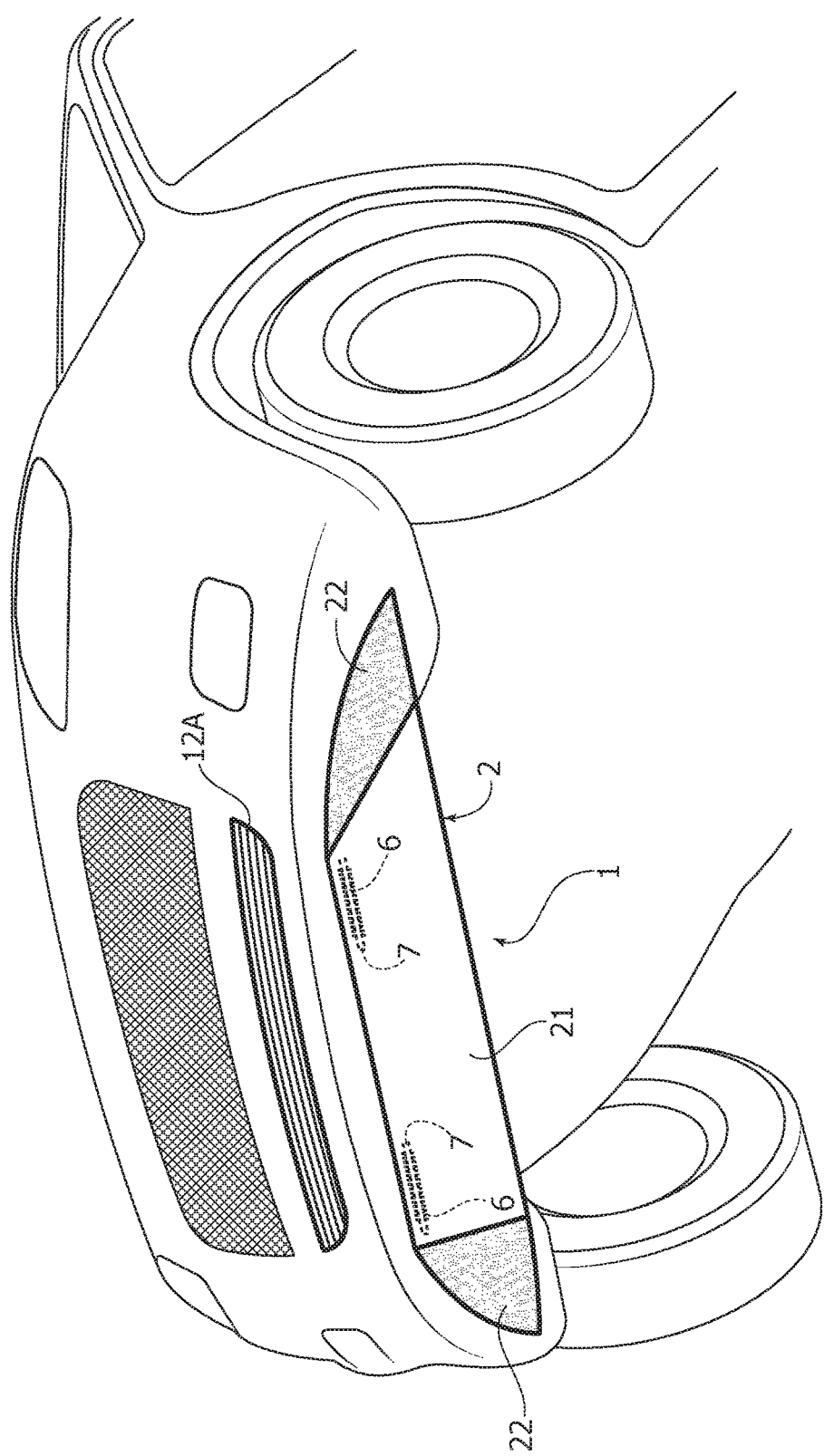
Figure 6:
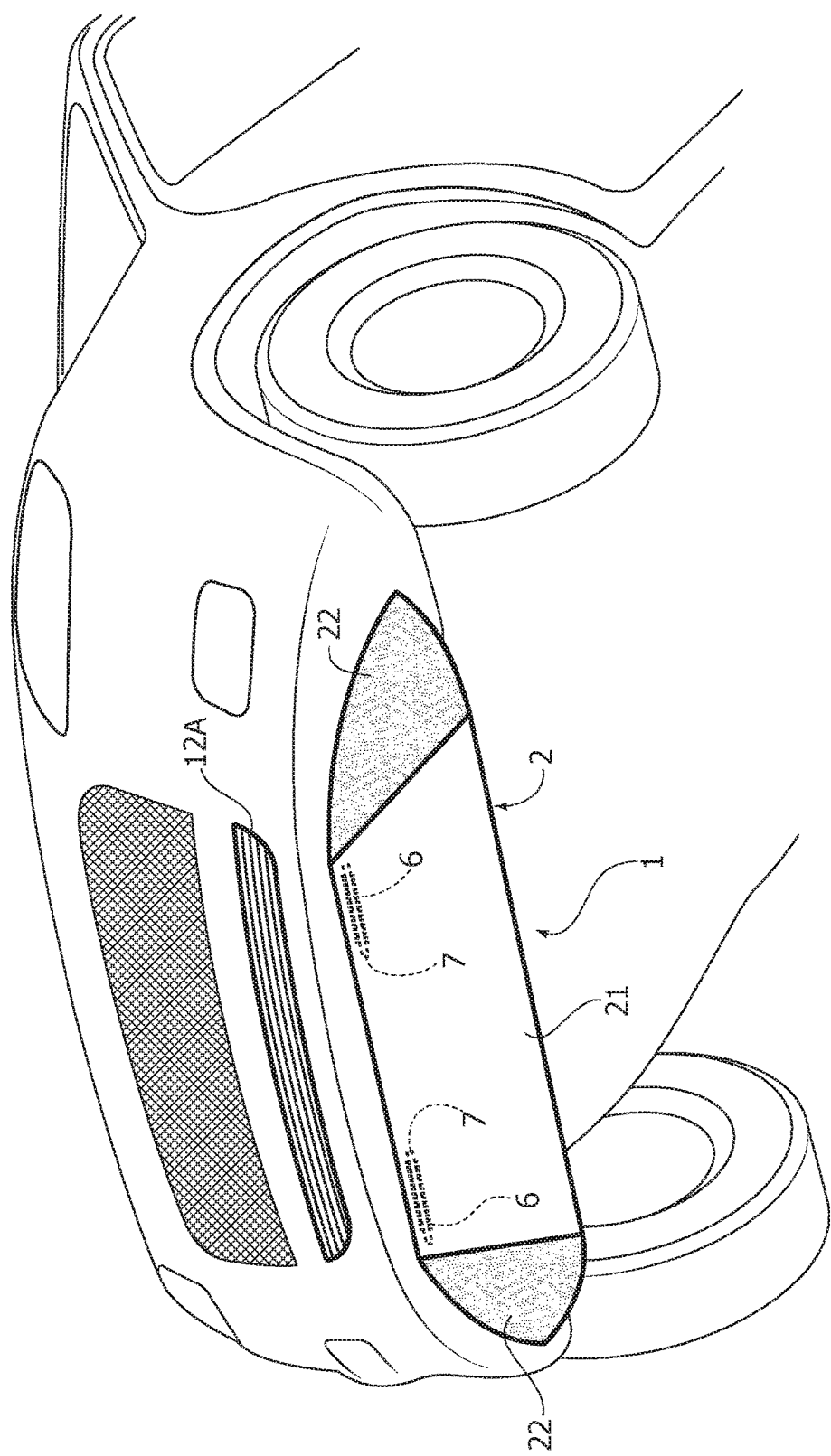
Figure 7:
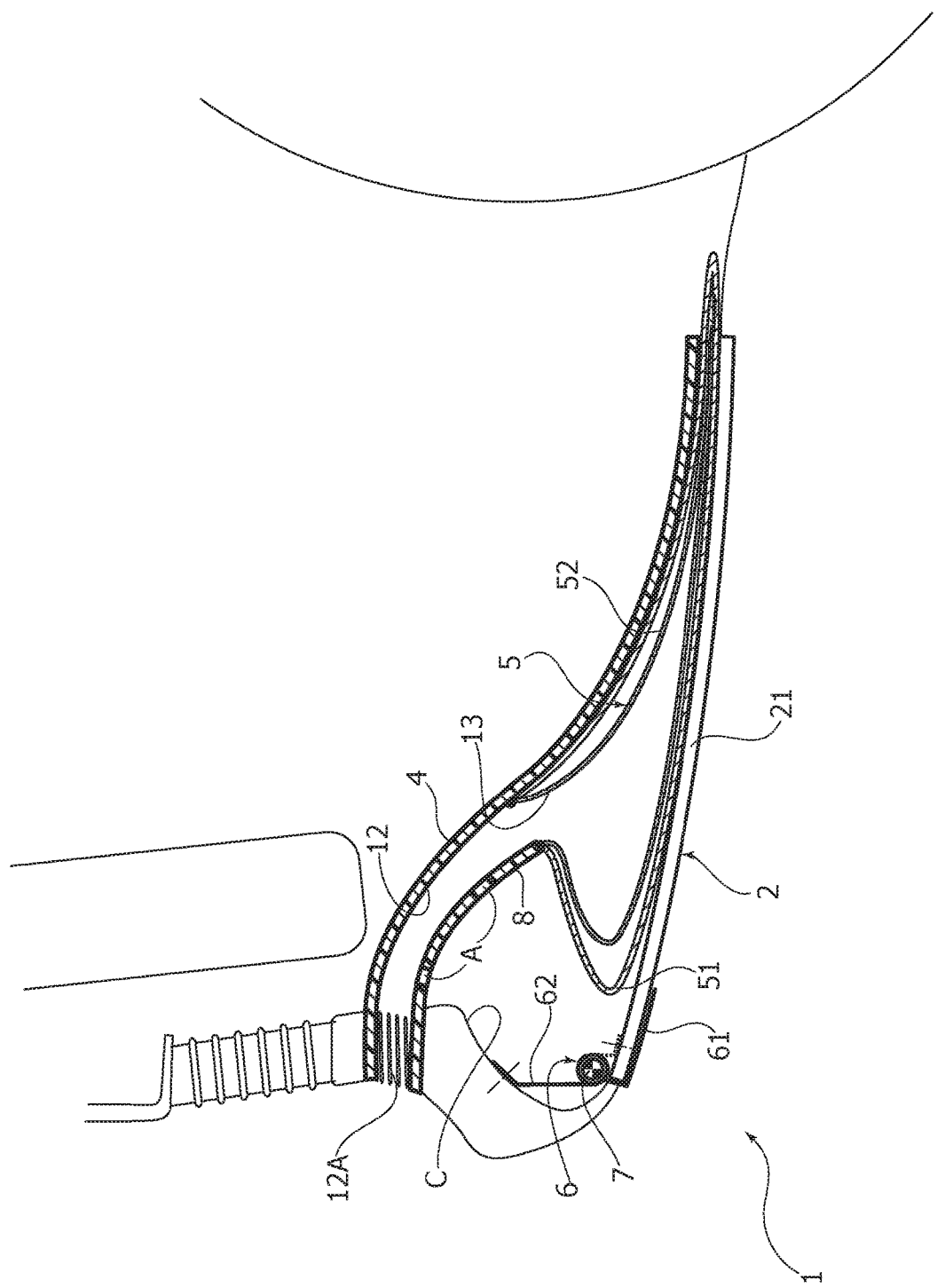

FIGS. 5 and 6 are two perspective views from the bottom of the motor-vehicle illustrated in FIGS. 1, 2 and 4 with the device respectively in its raised position and in its lowered position; and FIGS. 7 and 8 are two cross-sectional views of the device illustrated in the previous figures, respectively with the device in its raised position and in its lowered position.

In the following description various specific details are illustrated, aimed to a better understanding of the embodiments. The embodiments can be implemented without one or more of the specific details, or with other methods, components, or materials etc. In other cases, structures, materials or known operations are not shown or described in detail in order to avoid that various aspects of the embodiment may become obscure. The references herein used are only for convenience and therefore do not define the extent of protection or the scope of the embodiments.

As mentioned above, the present invention relates to an aerodynamic device for a motor-vehicle.

With reference to FIGS. 1-8, number 1 generally designates an aerodynamic device arranged under the body of the motor-vehicle. The device 1 comprises a panel structure 2 located under the front part of the motor-vehicle, wherein the panel structure 2 results movable between a raised position (illustrated in FIG. 5) and a lowered position (illustrated in FIG. 6). Than the panel structure 2 is adapted to be moved towards a lowered position when the speed of the motor-vehicle exceeds a predetermined threshold value, due to an airflow which invests the motor-vehicle and it is elastically biased towards a raised position by one or more spring means.

As illustrated in FIGS. 1 and 2 the panel structure 2 extends transversally below the body of the motor-vehicle and presents a central portion 21 with opposite sides in which there are two flexible panels 22. The central portion 21 is made of a plastic material having characteristics of high stiffness, while the flexible panels 22 connected to the structure of the motor-vehicle are preferably made of a plastic or elastomeric material, so as to follow the upward or downward movement of the central portion 21 of the aerodynamic device 1.

With reference to FIGS. 1, 2 and 3, the panel structure 2 and in particular its central portion 21 is pivotally mounted on the motor-vehicle bumper around a transverse axis I with respect to the longitudinal direction of the motor-vehicle. The panel structure 2 is elastically biased towards a raised position by spring means which in the herein illustrated embodiment are two springs 6 placed at the ends of said central portion 21 of said panel structure 2. Therefore the springs 6 have the function of elastic return of the panel structure 2 towards its raised position and in particular with reference to FIGS. 3 and 4, each spring 6 is a coil spring wrapped around a pivot pin 7 which is rigidly mounted on the motor-vehicle bumper. The coil springs 6 present two opposite ends 61, 62 which are respectively constrained to the lower surface of the panel structure 2 in such a way as to make easier the return of the panel structure 2 towards its raised position and towards the motor-vehicle bumper.

With reference to FIGS. 7 and 8 which show two cross-section views of the device 1 respectively in its raised position and in its lowered position, the aerodynamic device 1 further comprises an upper wall 4. The upper wall 4 is a fixed wall with respect to the motor-vehicle body and it is placed above the panel structure 2 so as to define a cavity C together the panel structure 2. Again, with reference to FIGS. 7 and 8 the front part of the upper wall 4 and the front part of the panel structure 2 are vertically spaced from each other, while their rear parts result to be adjacent to each other in such a way that the cavity C formed between the upper wall 4 and the panel structure 2 vertically shrinks in the direction of the rear part of the motor-vehicle.

Again with reference to FIGS. 7 and 8, the aerodynamic device 1 further comprises a bag structure 5 arranged inside of the cavity C between the panel structure 2 and the upper wall 4.

As previously indicated, the panel structure 2 is adapted to be moved towards a lowered position due to an airflow which invests the motor-vehicle when the motor-vehicle speed exceeds a predetermined threshold value. The bag structure 5 is therefore arranged inside of said cavity C in order to receive therewithin a portion of the airflow which invests the motor-vehicle, in such a way that above a predetermined threshold value of the motor-vehicle speed, the bag structure 5 is inflated and pushes the panel structure 2 towards its lowered position.

Again with reference to FIGS. 7, 8, in order to convey the airflow inside the bag structure 5, the device 1 further comprises an intermediate wall 8 interposed between the upper wall 4 and the panel structure 2. The intermediate wall 8 presents its front edge rigidly fixed to the motor-vehicle bumper and defines, with the upper wall 4, a duct 12 adapted to direct the airflow inside the cavity C. The duct 12 presents a first end in correspondence of a motor-vehicle front grid 12A provided with horizontal fins (as illustrated in the drawings) or vertical fins. The duct 12 presents a terminal end 13 connected to, and in communication with, a mouth 13 of the bag structure 5. In this way, the duct 12 defined between the upper wall 4 and the intermediate wall 8 conveys the airflow which invests the motor-vehicle during travel inside the bag structure 5 which, as a consequence of the inflation, pushes the panel structure 2 in its lowered position (as illustrated in FIG. 8) overcoming in this way the elastic resistance of the springs 6.

Again with reference to FIGS. 7, 8, the bag structure 5 comprises a first outer bag element 51 and a second inner bag element 52. The outer element 51 presents an upper portion connected to the upper wall 4 of the device 1 and presents a lower portion connected to the panel structure 2. The second inner element 52, which is provided inside of the first outer element 51, defines with the outer element 51 the mouth 13 connected to, and in communication with, the terminal end of the directing duct 12 of the airflow which invests the motor-vehicle. Again with reference to FIGS. 7, 8 the intermediate wall 8 presents a longitudinal extension lower than the longitudinal extension of the upper wall 4 and of the panel structure 2 in such a way as to enable the arrangement of the bag structure 5 with its mouth 13 connected to the terminal end of the duct 12. The intermediate wall 8 of the aerodynamic device 1 further presents a plurality of openings A along its longitudinal extension. Such openings A are provided for the drainage of any water which eventually can enter inside the duct 12 during the operation of the motor-vehicle. In this way entrance of water inside the bag structure 5 is avoided considering that the entrance of water could affect the proper operation of the device 1.

As previously indicated, FIG. 7 illustrates the device 1 according to the invention in its raised position. Such condition occurs at low speed of the motor-vehicle in such a way as to enable the overcoming of obstacles present on the road.

FIG. 8 illustrates instead the device 1 according to the invention in its lowered position which occurs as a consequence of the inflation of the bag structure 5 after passing a predetermined threshold value of the motor-vehicle speed. After passing the predetermined threshold value of the motor-vehicle speed, an airflow enters inside the duct 12 and inside the bag structure 5 having its mouth connected to the terminal end of the duct 12. As a consequence the bag structure 5 is inflated and pushes the panel structure 2 towards its lowered position overcoming the resistance of the spring 6 which tends to return the panel structure 2 towards the top.

When the motor-vehicle speed returns below the predetermined threshold value, the bag structure 5 starts to deflate and consequently the spring 6 elastically biases the panel structure 2 to its raised position illustrated in FIG. 7.

The aerodynamic device 1 according to the invention has the advantage of improving the aerodynamic performances of the motor-vehicle while being at the same time simple, efficient reliable in its operation and of low cost.

Furthermore, the aerodynamic device 1 is adapted to be mounted with simple operations also on motor-vehicles in which the aerodynamic device is not originally provided. Furthermore, by means of few modification to the constructive elements of the device 1, the device can be installed on motor-vehicle of different classes.

Naturally, while the principle of the invention remains the same, the details of construction and the embodiments may widely vary with respect to what has been described and shown purely by way of example, without departing from the scope of the invention.

What is claimed is:

1. An aerodynamic device for a motor-vehicle, comprising:

a panel structure located under a front part of the motor-vehicle and pivotally mounted around an axis transverse with respect to a longitudinal direction of the motor-vehicle, said panel structure being elastically biased towards a raised position and being adapted to be moved towards a lowered position when a motor-vehicle speed exceeds a predetermined threshold value, due to an airflow which invests the motor-vehicle, and an upper wall which is fixed with respect to a motor-vehicle body, and placed above said panel structure so as to define a cavity together with said panel structure, a bag structure arranged inside said cavity between said panel structure and said upper wall for receiving in its interior a portion of said airflow which invests the motor-vehicle during travel, wherein above said predetermined threshold value of the motor-vehicle speed, said bag structure is inflated and pushes said panel structure towards its lowered position;

wherein said cavity vertically shrinks in a direction of a rear part of the motor-vehicle; and wherein a front part of said upper wall and a front part of said panel structure are vertically spaced form each other, while a rear part of said upper wall and a rear part of said panel structure are adjacent to each other, in such a way to provide for said cavity vertically shrinking in the direction of the rear part of the motor-vehicle.

2. An aerodynamic device for a motor-vehicle, comprising:

a panel structure located under a front part of the motor-vehicle and pivotally mounted around an axis transverse with respect to a longitudinal direction of the motor-vehicle, said panel structure being elastically biased towards a raised position and being adapted to be moved towards a lowered position when a motor-vehicle speed exceeds a predetermined threshold value, due to an airflow which invests the motor-vehicle, an upper wall which is fixed with respect to a motor-vehicle body, and placed above said panel structure so as to define a cavity together with said panel structure, and a bag structure arranged inside said cavity between said panel structure and said upper wall for receiving in its interior a portion of said airflow which invests the motor-vehicle during travel, wherein above said predetermined threshold value of the motor-vehicle speed, said bag structure is inflated and pushes said panel structure towards its lowered position, wherein said device comprises at least one spring having a function of elastically biasing said panel structure towards said raised position, and wherein said device further comprises an intermediate wall placed between said upper wall and said panel structure, in which said upper wall and said intermediate wall define a duct for directing said airflow inside said bag structure.

3. The device according to claim 2, wherein said panel structure is pivotally mounted to a motor-vehicle bumper by at least one pivot pin, around a transverse axis with respect to the longitudinal direction of the motor-vehicle, and wherein said at least one spring is a coil spring wound around said pivot pin and has opposite ends operatively connected to the panel structure and to the bumper.

4. The device according to claim 2, wherein said intermediate wall has its front edge rigidly fixed to the motor-vehicle bumper, and wherein said duct starts from an inlet opening located on a front surface of the motor-vehicle.

5. The device according to claim 4, wherein said bag structure has a mouth connected to, and in communication with, a terminal end of said duct, in such a way that said duct conveys said airflow inside said bag structure.

6. The device according to claim 5, wherein said bag structure comprises an outer bag element having an upper portion connected to said upper wall and having a lower portion connected to said panel structure.

7. The device according to claim 6, wherein said bag structure further comprises an inner bag element, wherein said outer bag element and said inner bag element together define said mouth connected to, and in communication with, said terminal end of said duct for directing said airflow.

8. The device according to claim 4, wherein said intermediate wall longitudinally extends inside said cavity and has a longitudinal extension lower than a longitudinal extension of said panel structure and of said upper wall.

9. An aerodynamic device for a motor-vehicle, comprising:

a panel structure located under a front part of the motor-vehicle and pivotally mounted around an axis transverse with respect to a longitudinal direction of the motor-vehicle, said panel structure being elastically biased towards a raised position and being adapted to be moved towards a lowered position when a motor-vehicle speed exceeds a predetermined threshold value, due to an airflow which invests the motor-vehicle, an upper wall which is fixed with respect to a motor-vehicle body, and placed above said panel structure so as to define a cavity together with said panel structure, and a bag structure arranged inside said cavity between said panel structure and said upper wall for receiving in its interior a portion of said airflow which invests the motor-vehicle during travel, wherein above said predetermined threshold value of the motor-vehicle speed, said bag structure is inflated and pushes said panel structure towards its lowered position, and wherein said panel structure has two opposite sides connected to a motor-vehicle structure, or connected to a front bumper secured to said motor-vehicle structure, by two flexible panels.

10. The device according to claim 4, wherein said intermediate wall has at least one opening along its longitudinal extension, arranged for the drainage of any water which may have entered in the duct, in such a way as to avoid entrance of water inside said bag structure.

* * * * *